(12) United States Patent
Park

(10) Patent No.: US 11,285,898 B2
(45) Date of Patent: Mar. 29, 2022

(54) APPARATUS FOR SENSING FORWARD COLLISION

(71) Applicants: HYUNDAI MOTOR COMPANY, Seoul (KR); KIA MOTORS CORPORATION, Seoul (KR)

(72) Inventor: Ji-Woong Park, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 4 days.

(21) Appl. No.: 16/842,381

(22) Filed: Apr. 7, 2020

(65) Prior Publication Data
US 2021/0213900 A1 Jul. 15, 2021

(30) Foreign Application Priority Data
Jan. 14, 2020 (KR) .................. 10-2020-0004825

(51) Int. Cl.
| *B60R 21/01* | (2006.01) |
| --- | --- |
| *B60R 21/013* | (2006.01) |
| *B62D 25/16* | (2006.01) |
| *B62D 21/17* | (2006.01) |
| *B60R 11/00* | (2006.01) |

(52) U.S. Cl.
CPC .......... *B60R 21/013* (2013.01); *B60R 11/00* (2013.01); *B62D 21/17* (2013.01); *B62D 25/16* (2013.01); *B60R 2011/004* (2013.01)

(58) Field of Classification Search
CPC .. B62D 25/084; B62D 25/085; B62D 25/082; B62D 25/08; B62D 21/152; B62D 25/088; B62D 25/14; B62D 25/163; B62D 21/11; B60R 19/18; B60R 19/24; B60R 19/34; B60R 2019/1886; B60R 2019/247; B60R 19/02; B60R 19/023; B60R 19/12; B60R 2019/1833
USPC ... 296/193.09, 187.09, 193.11, 203.02, 1.08, 296/193.04, 193.1
See application file for complete search history.

(56) References Cited

U.S. PATENT DOCUMENTS

| 6,516,278 | B1 * | 2/2003 | Ishizaki | ................ B60R 21/013 |
| --- | --- | --- | --- | --- |
| | | | | 180/274 |
| 7,296,824 | B2 * | 11/2007 | Yasui | .................. B62D 21/152 |
| | | | | 280/784 |

(Continued)

FOREIGN PATENT DOCUMENTS

KR 10-0692704 B 3/2007

*Primary Examiner* — D Glenn Dayoan
*Assistant Examiner* — Sunsurraye Westbrook
(74) *Attorney, Agent, or Firm* — Lempia Summerfield Katz LLC

(57) ABSTRACT

An apparatus for sensing a forward collision may include: a front end module (FEM) upper side member having a first end combined with a FEM upper member and a second end formed to extend toward a fender; a FEM vertical member having a first end combined with a front side member combined along a length direction of a vehicle from a first end portion of the FEM upper member and a second end combined with the FEM upper member; and a front impact sensor (FIS) configured to sense an impact being applied from a front of the vehicle. In particular, the FEM upper side member and the FEM vertical member are combined to overlap the FEM upper member.

9 Claims, 12 Drawing Sheets

(56) References Cited

U.S. PATENT DOCUMENTS

| | | | | |
|---|---|---|---|---|
| 8,485,592 B2* | 7/2013 | Shin | ................. | B62D 21/152 |
| | | | | 296/203.02 |
| 2007/0262614 A1* | 11/2007 | Asai | ................. | B62D 21/152 |
| | | | | 296/193.09 |
| 2016/0137230 A1* | 5/2016 | Tan | ..................... | G01S 7/02 |
| | | | | 296/193.09 |

* cited by examiner

IT IS POSSIBLE TO DETERMINE WHETHER TO PERFORM LOW-PRESSURE DEPLOYMENT / HIGH-PRESSURE DEPLOYMENT AT TIME 41 ms EARLIER THAN TIME IN RELATED ART

APPARATUS FOR SENSING FORWARD COLLISION

CROSS-REFERENCE TO RELATED APPLICATION

This application claims priority to and the benefit of Korean Patent Application No. 10-2020-0004825, filed on Jan. 14, 2020, the entire contents of which are incorporated herein by reference.

FIELD

The present disclosure relates to an apparatus for sensing a collision in front of a vehicle.

BACKGROUND

The statements in this section merely provide background information related to the present disclosure and may not constitute prior art.

An airbag is a means for protecting a passenger against an impact caused by vehicle collision, and in proceeding with vehicle development, determination of whether to deploy an airbag and determination of the kind of collision is one of very important development items to improve collision safety of a passenger.

According to a control algorithm for determining whether it is necessary to deploy an airbag at an initial time of vehicle collision and a deployment pressure (high pressure or low pressure) of the airbag, an airbag control unit (ACU) performs a comprehensive determination based on a signal from a front impact sensor (FIS) mounted on a vehicle body.

In this case, the most important factors are as follows.

First, to what extent the kind of collision can be discriminated through the transferred signal at an initial collision time?

Second, how robust a load path around the signal should be in order to discriminate a deployment/non-deployment signal without a noise?

Referring to FIG. 1, we have discovered that in the related art, a front impact sensor (FIS) 2 is mounted on a front end module 1 in front of a front side member 3 to sense a forward collision, and a load path in a location where the front impact sensor 2 is mounted is not quite satisfactory, and thus a noise occurs when the sensor identifies the signal.

Further, we have found that the stiffness of the vehicle body is insufficient, and thus there is a problem that signal discrimination at an initial collision time is not enough to determine the kind of collision and safety is insufficient due to an increase of a signal variation width.

The foregoing description of the background technology is intended merely to help the understanding of the background of the present disclosure, and is not intended to mean that the present disclosure falls within the purview of the related art that is already known to those of ordinary skill in the art.

SUMMARY

The present disclosure provides an apparatus for sensing a forward collision capable of improving forward collision sensing performance through setting of a load path and an optimized mounting location of a front impact sensor.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In one aspect of the present disclosure, an apparatus for sensing a forward collision includes: a front end module (FEM) upper side member that includes a first end combined with a FEM upper member and a second end formed to extend toward a fender; a FEM vertical member that has a first end combined with a front side member combined along a length direction of a vehicle from a first end portion of the FEM upper member and a second end combined with the FEM upper member; and a front impact sensor (FIS) configured to sense an impact being applied from a front of the vehicle. In particular, the FEM upper side member and the FEM vertical member are combined to overlap the FEM upper member.

The front impact sensor is mounted on a portion where the FEM upper side member and the FEM vertical member are combined to overlap the FEM upper member.

The apparatus further includes: a fender apron upper front member that has a first end combined with the fender and a second end combined with a front end module (FEM). In particular, the first end of the FEM upper side member is combined with the fender apron upper front member.

The fender apron upper front member, the FEM upper side member, and the FEM vertical member form a truss structure.

The apparatus further includes a sensor connection member fastened to the front impact sensor and configured to penetrate the portion where the FEM upper side member and the FEM vertical member are combined to overlap each other.

The sensor connection member is combined with a FEM fastening member penetrating the FEM upper member.

A wire connected to the front impact sensor is wired to pass through an interior of the front side member.

In another aspect of the present disclosure, an apparatus for sensing a forward collision includes: a front impact sensor (FIS) provided in the rear of a FEM upper member and configured to sense an impact being applied from a front of a vehicle; a FEM fastening member fastened to penetrate the FEM upper member; and a sensor connection member combined between the front impact sensor and the FEM fastening member, wherein the front impact sensor, the FEM fastening member, and the sensor connection member are coaxially deployed.

The apparatus further includes: a FEM upper side member that includes a first end combined on a fender side and a second end combined with the FEM upper member; and a FEM vertical member that includes a first end combined with a front side member combined along a length direction of the vehicle from a first end portion of the FEM upper member and a second end combined with the FEM upper member, wherein the FEM upper side member and the FEM vertical member are combined to overlap the FEM upper member.

The front impact sensor is mounted on a portion where the FEM upper side member and the FEM vertical member are combined to overlap the FEM upper member.

The sensor connection member is combined to penetrate the portion where the FEM upper side member and the FEM vertical member are combined to overlap each other.

A wire connected to the front impact sensor is wired to pass through an interior of the front side member.

According to the apparatus for sensing a forward collision according to the present disclosure, the truss type load path is configured on the mounting part of the front impact sensor, and thus the signal is transferred without a loss during the collision to improve the signal discrimination of the airbag signal.

Further, because the collision signal transfer path is dispersed and the signal transfer robustness is improved, the kind of collision can be discriminated at an earlier time than that in the related art.

It is to be understood that both the foregoing general description and the following detailed description of the present disclosure are exemplary and explanatory and are intended to provide further explanation of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
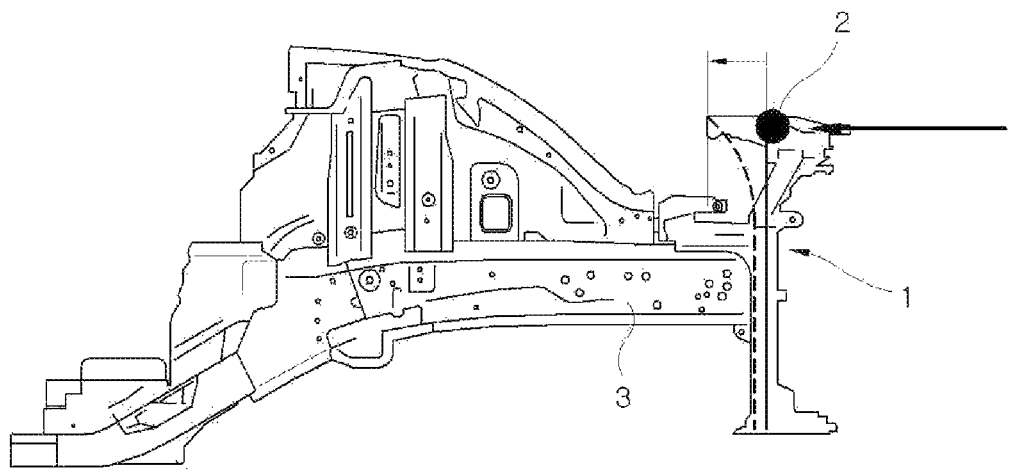
FIG. 1 is a view illustrating a mounting location of a front impact sensor in the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The above-described objects, features, and advantages of the present disclosure will be described in detail with reference to the accompanying drawings, and accordingly, those of ordinary skill in the art to which the present disclosure pertains will be able to fully understand and easily embody the technical concept of the present disclosure.

In describing the preferred embodiments of the present disclosure, detailed description of well-known technologies related to the present disclosure will be reduced or omitted in the case where it is determined that it obscures the subject matter of the present disclosure in unnecessary detail.

Figure 2:
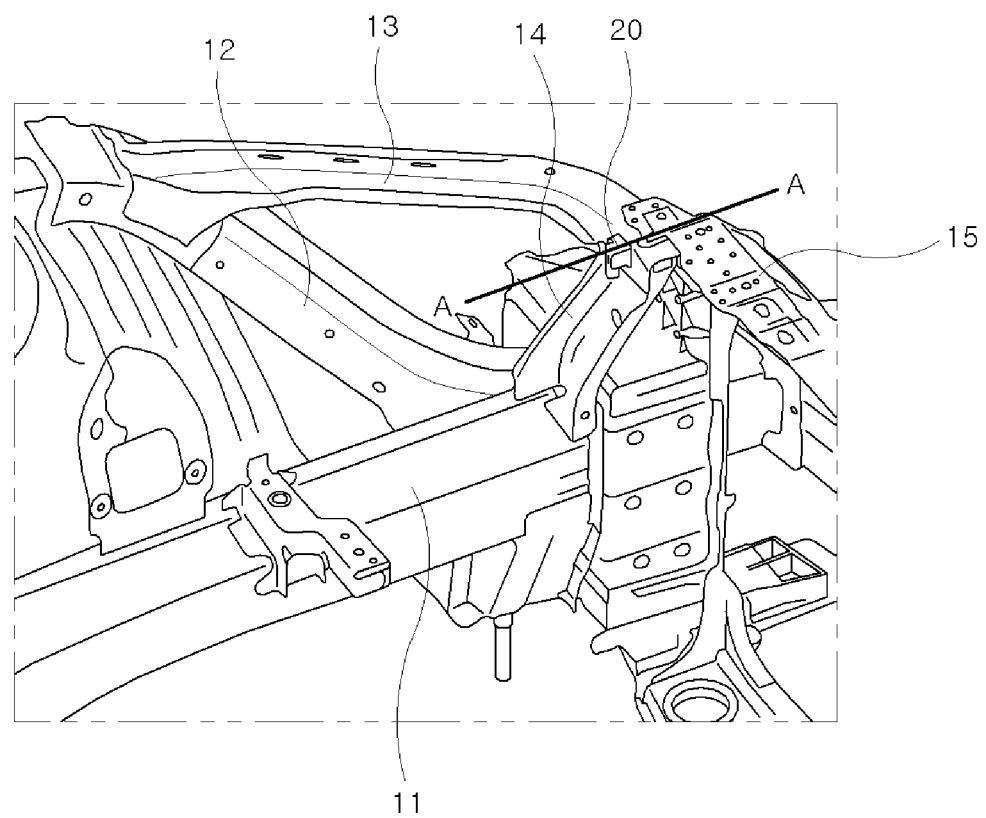
FIG. 2 is a view illustrating an apparatus for sensing a forward collision in one form of the present disclosure.
Figure 3:
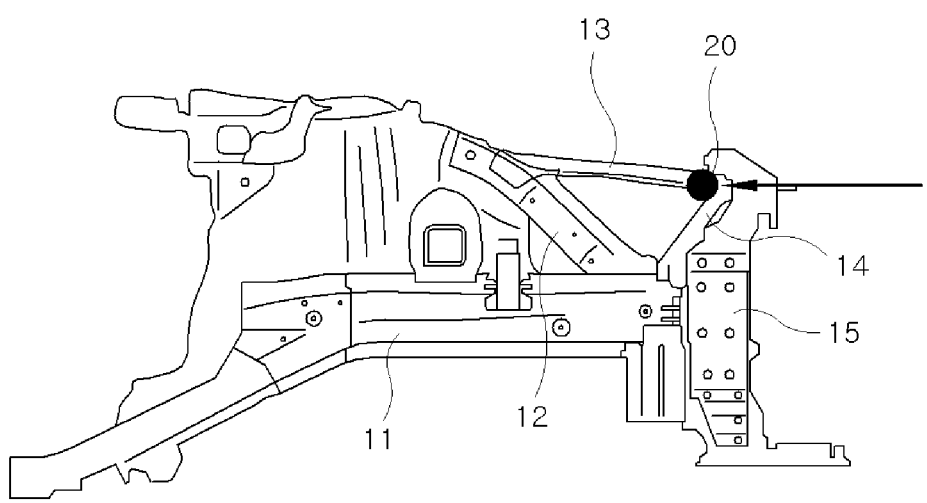
FIG. 3 is a view illustrating an apparatus for sensing a forward collision in one form of the present disclosure.

FIG. 2 is a view illustrating an apparatus for sensing a forward collision according to the present disclosure, and FIG. 3 is a view illustrating an apparatus for sensing a forward collision according to the present disclosure in a planar manner.

Hereinafter, referring to FIGS. 2 and 3, an apparatus for sensing a forward collision according to an embodiment of the present disclosure will be described.

The present disclosure relates to an apparatus for sensing a forward collision, which enables a load path to be applied from a sensor mounting part to strengthen the airbag sensing performance and enables a signal from a sensor to be transferred without a loss.

As illustrated, a front side member 11, a fender apron upper front member 12, a FEM upper side member 13, a FEM vertical member 14, and a FEM upper member 15 are configured to be directly and indirectly connected to one another on a vehicle body, and a front impact sensor (FIS) 20 is mounted on the vehicle body.

The FEM, being a front end module, is a module that is one of various components forming a frame of a front surface of a vehicle, and may be divided into the FEM upper member 15, a FEM lower member, and a FEM side member.

First, the apparatus includes the FEM upper member 15 that is one constituent element of the FEM and the front side member 11 combined in a length direction of the vehicle from one end portion of the FEM upper member 15.

Further, the apparatus includes the fender apron upper front member 12 having one end combined with a fender and the other end combined with the front end module (FEM), the FEM upper side member 13 having one end combined with one end portion on the fender side of the fender apron upper front member 12 and the other end combined with the FEM upper member 15, and the FEM vertical member 14 having one end combined with the front side member 11 and the other end combined with the FEM upper member 15.

In particular, the other end of the FEM upper side member 13 that is combined with the FEM upper member 15 and the other end of the FEM vertical member 14 overlap each other in the length direction of the vehicle, and are combined together with the FEM upper member 15.

Further, a front impact sensor 20 is mounted on a portion where the FEM upper side member 13 and the FEM vertical member 14 are combined to overlap each other.

Accordingly, as seen from the shape of a side surface of FIG. 3, the fender apron upper front member 12, the FEM upper side member 13, and the FEM vertical member 14 form a truss shape.

By the above-described truss structure and an integrated mounting structure of the front impact sensor 20, the FEM upper side member 13, and the FEM vertical member 14, the signal from the sensor can be transferred without time delay when the front collision is sensed.

Figure 5:
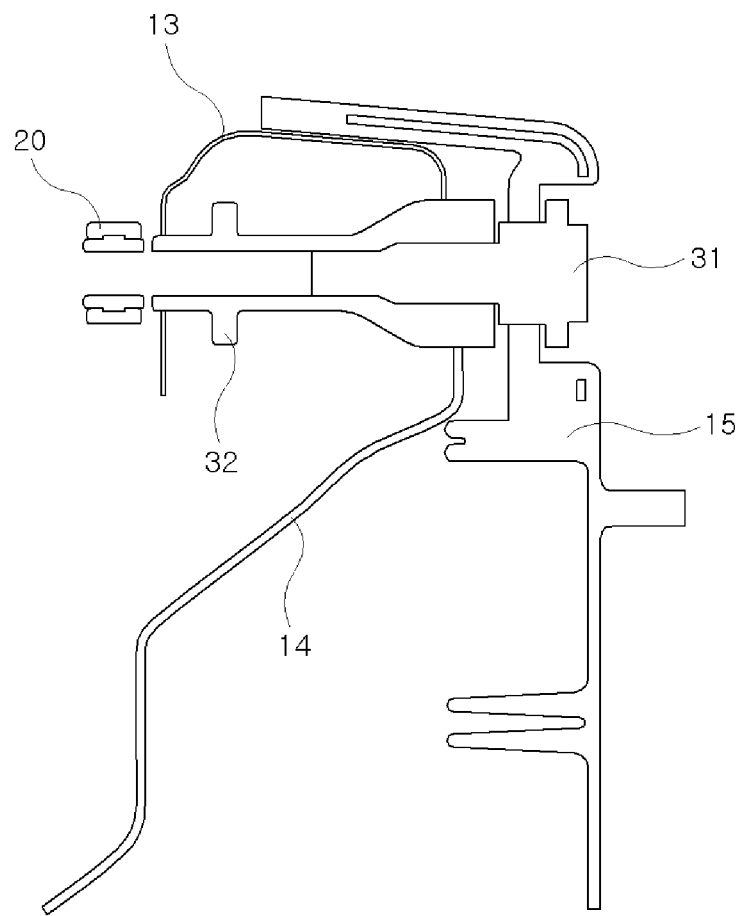
FIG. 5 is a view taken along line A-A of FIG. 2 to be compared with the view of FIG. 4.

As described above, the FEM upper side member 13 and the FEM vertical member 14 are combined to overlap the FEM upper member 15, and as illustrated in FIG. 5, the front impact sensor 20 is mounted on a portion where the members 13 and 14 are combined to overlap the FEM upper member 15.

The FEM upper side member 13 and the FEM vertical member 14 are mounted on the FEM upper member 15 as a FEM fastening member 31 successively penetrates the FEM upper member 15, the FEM vertical member 14, and the FEM upper side member 13, and one side of the sensor connection member 32 is fastened to the FEM fastening member 31 and the other side of the sensor connection member 32 is fastened to the front impact sensor 20 through penetrating of the FEM upper side member 13. It may be more suitable to the impact sensing performance to coaxially deploy the front impact sensor 20, the FEM fastening member 31, and the sensor connection member 32.

According to the present disclosure, because the front impact sensor 20 is fastened by integrated hardware, such as the sensor connection member 32, the load can be transferred more accurately against the front impact, and thus the sensing stability can be improved.

Figure 11:
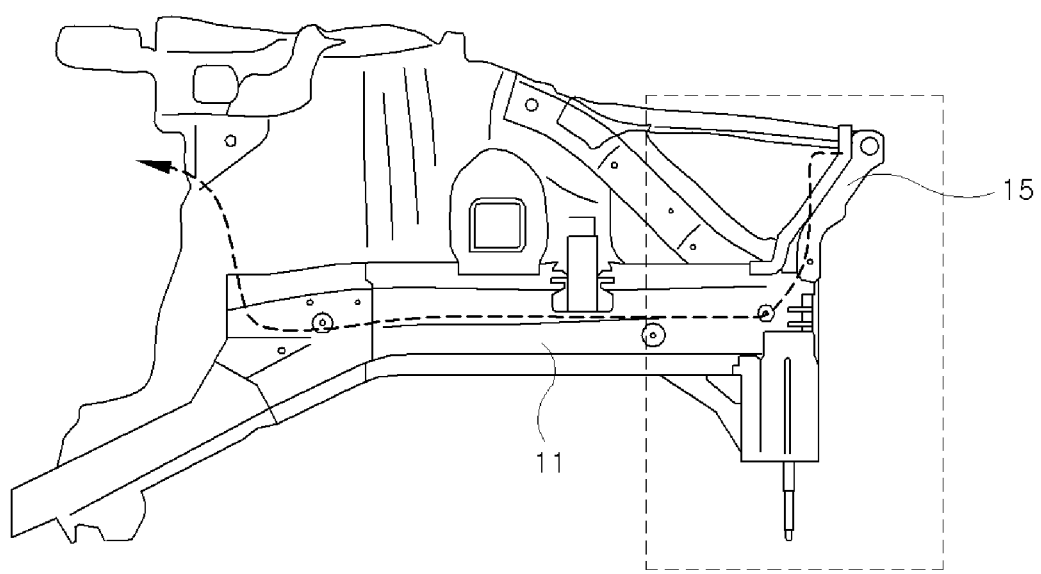
FIG. 11 is a view illustrating a signal transfer during a forward collision in one form of the present disclosure.
Figure 12:
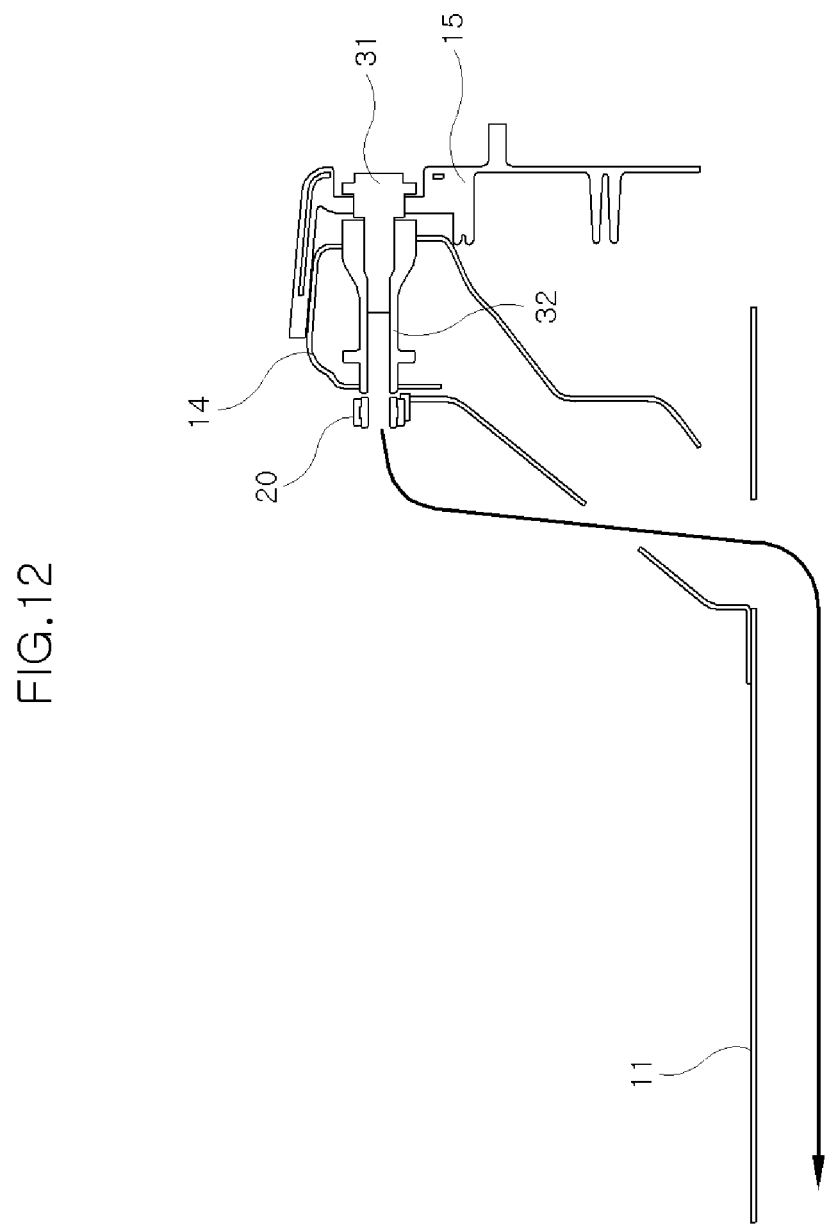
FIG. 12 is a view illustrating the shape of a side end surface of a dotted line portion of FIG. 11 illustrating the signal transfer in one form of the present disclosure.

Further, as illustrated in FIGS. 11 and 12, during the forward collision, a wire from the front impact sensor 20 can be wired to pass through an interior of the front side member 11, and thus disconnection of the wire can be prevented.

Figure 4:
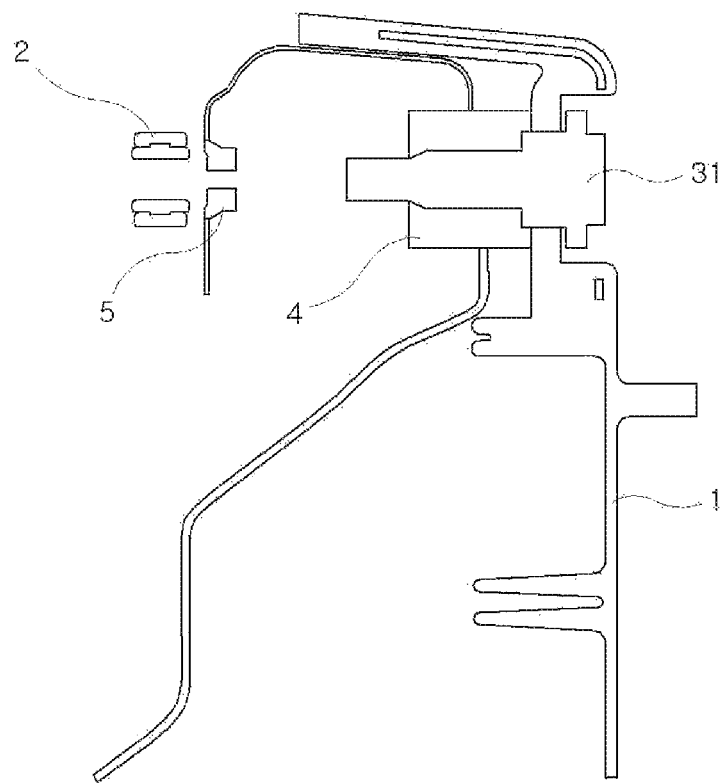
FIG. 4 is a view illustrating a structure in the related art.

Referring to FIG. 4 illustrating the structure in the related art, a sensor connection member includes separation type hardware (namely, a first connection member 4 and a second connection member 5). The first connection member 4 is combined with the FEM fastening member 31 and the second connection member 5 is combined with the front impact sensor 20.

Figure 10:
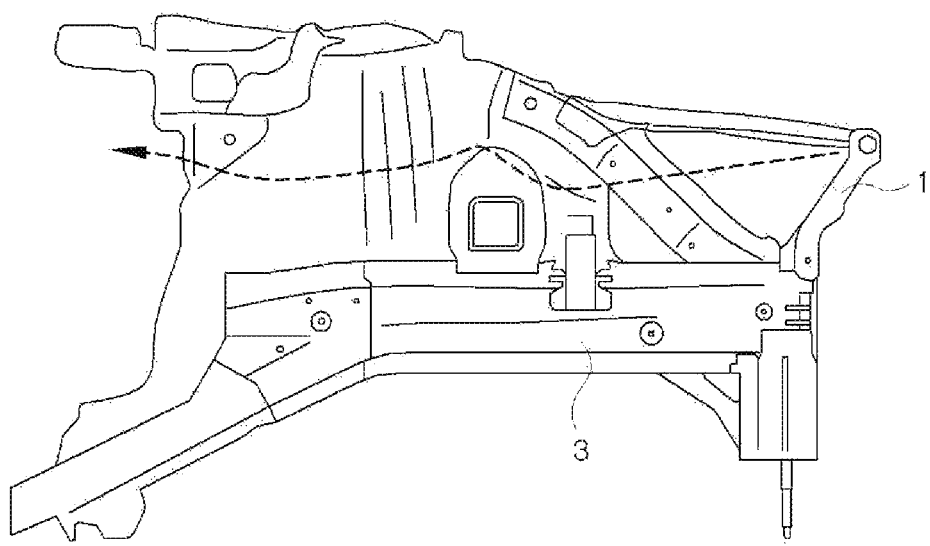
FIG. 10 is a view illustrating a signal transfer in the related art.

Accordingly, the load transfer is not quite satisfactory against the front impact, and the sensing stability deteriorates. Further, as illustrated in FIG. 10, the wire from the front impact sensor 20 is exposed to an outside, and thus the wire may be disconnected when the forward collision occurs.

Figure 6:
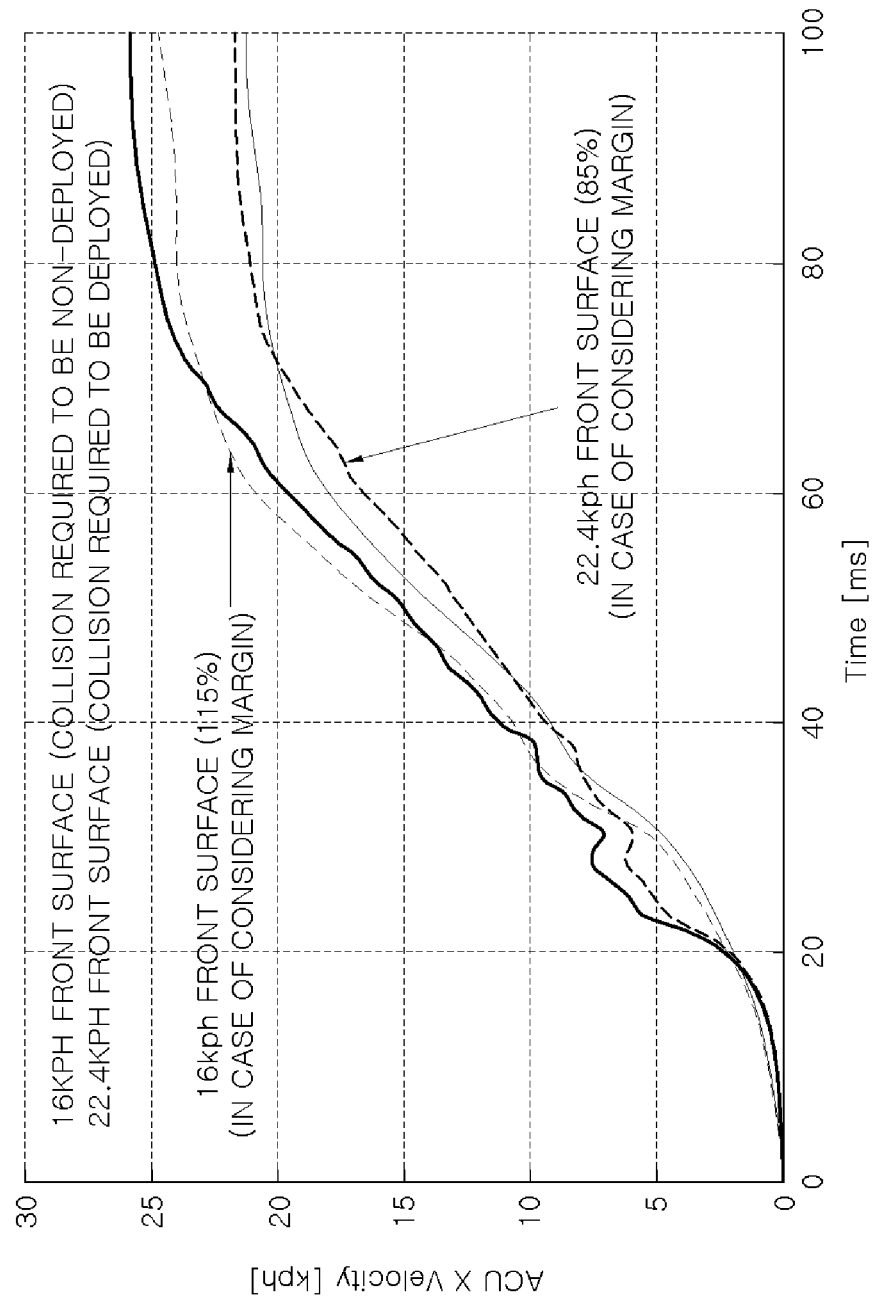
FIGS. 6 and 7 are diagrams comparatively illustrating airbag signal discriminations between the related art and the present disclosure.
Figure 7:
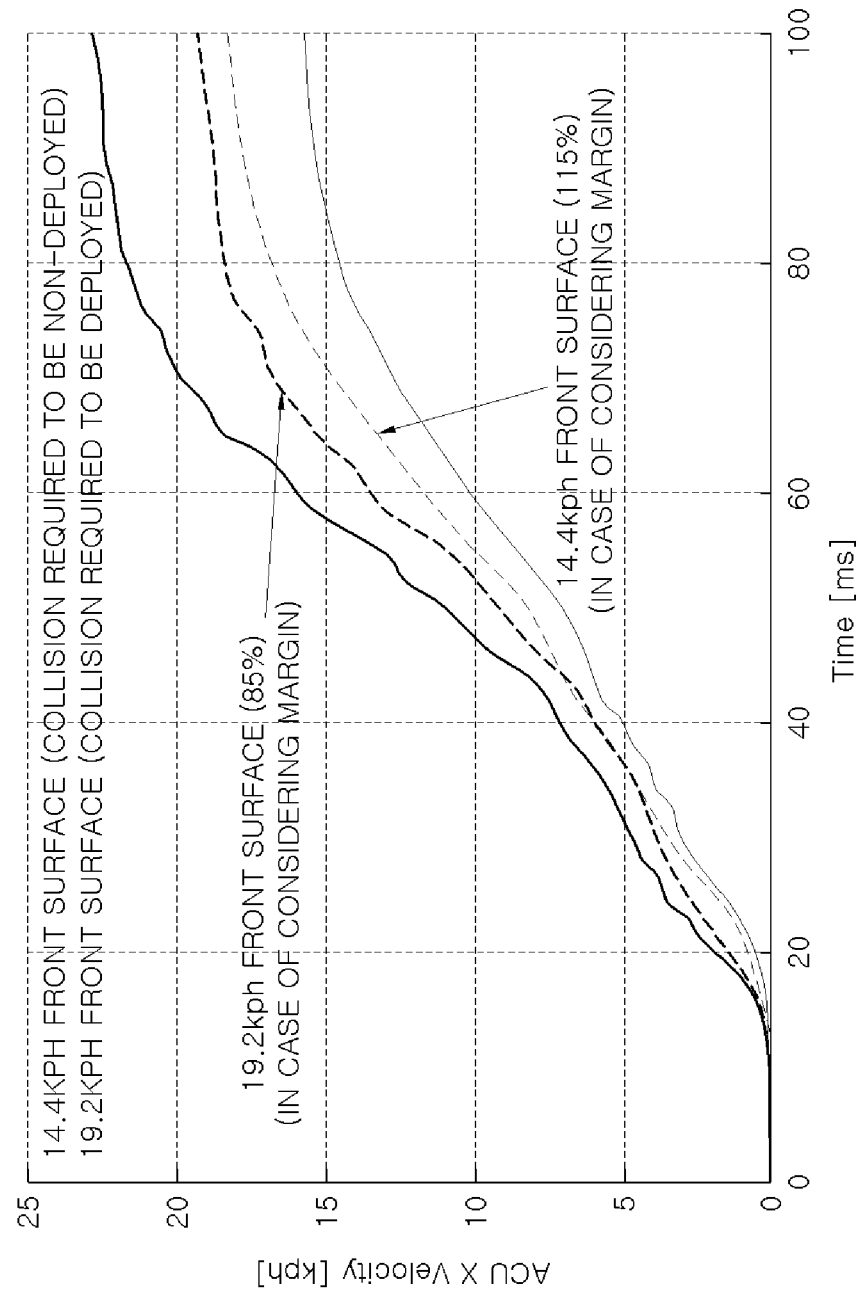

FIGS. 6 and 7 are diagrams comparatively illustrating airbag signal discriminations between the related art and the present disclosure.

In the related art, due to the absence of a separate longitudinal load path structure, resistivity is degraded when the load is input, and it is difficult to easily transfer the collision signal.

Accordingly, as illustrated in FIG. 6, the noise of the sensor occurs greatly, and in the case of considering a margin, a reversal phenomenon between the deployment/non-deployment signals may occur, and this may cause an error to occur in the determination of whether to deploy the airbag.

In contrast with this, according to the present disclosure, the truss type load path is configured on the mounting part of the front impact sensor, and thus the signal is transferred without a loss during the collision to improve the signal discrimination.

Accordingly, as illustrated in FIG. 7, a small noise of the sensor occurs, and even in the case of considering a margin, a reversal phenomenon between the deployment/non-deployment signals does not occur, and thus no error occurs in the determination of whether to deploy the airbag.

Figure 8:
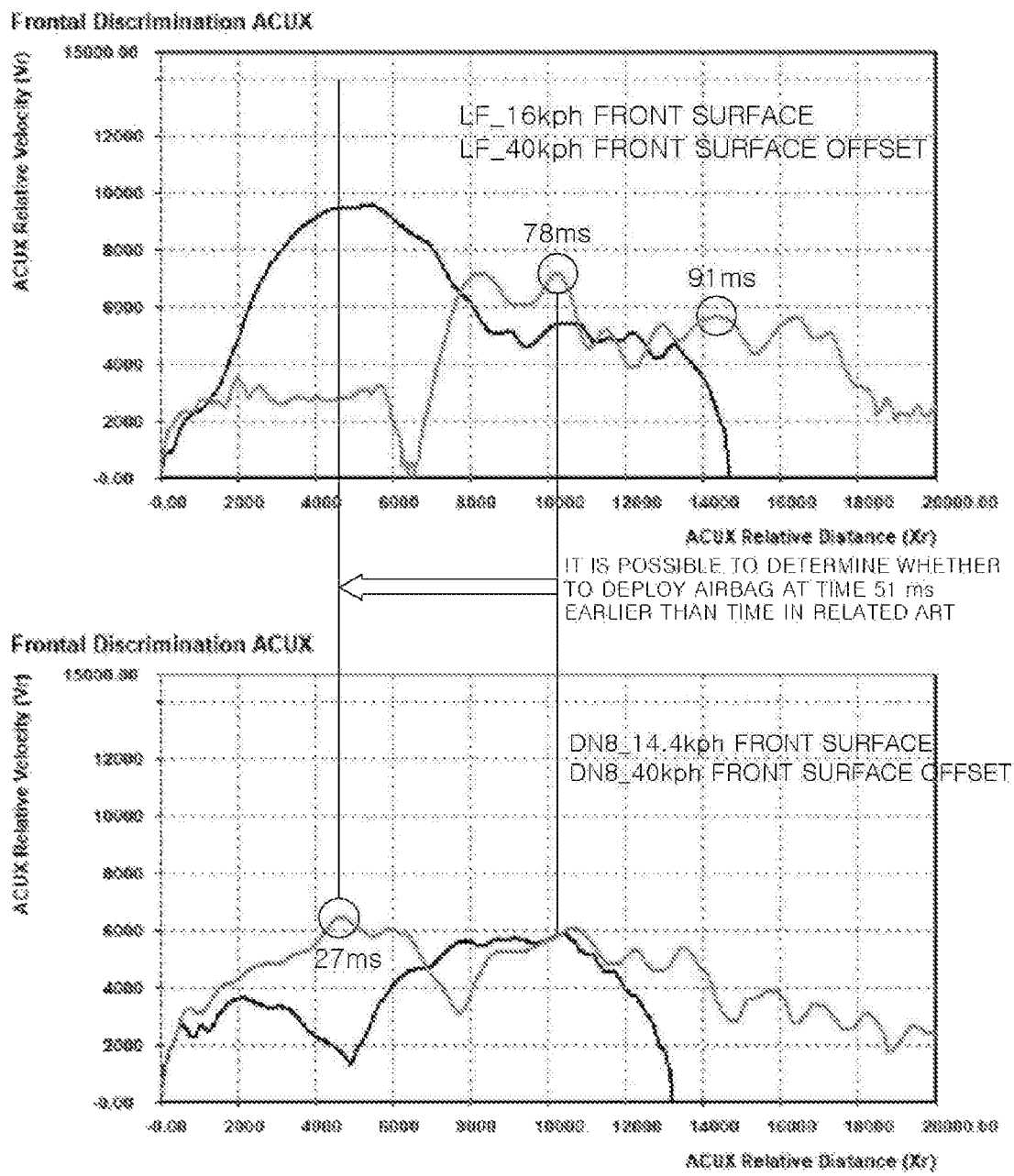
FIG. 8 shows diagrams illustrating airbag signal sensing time points in the related art.
Figure 9:
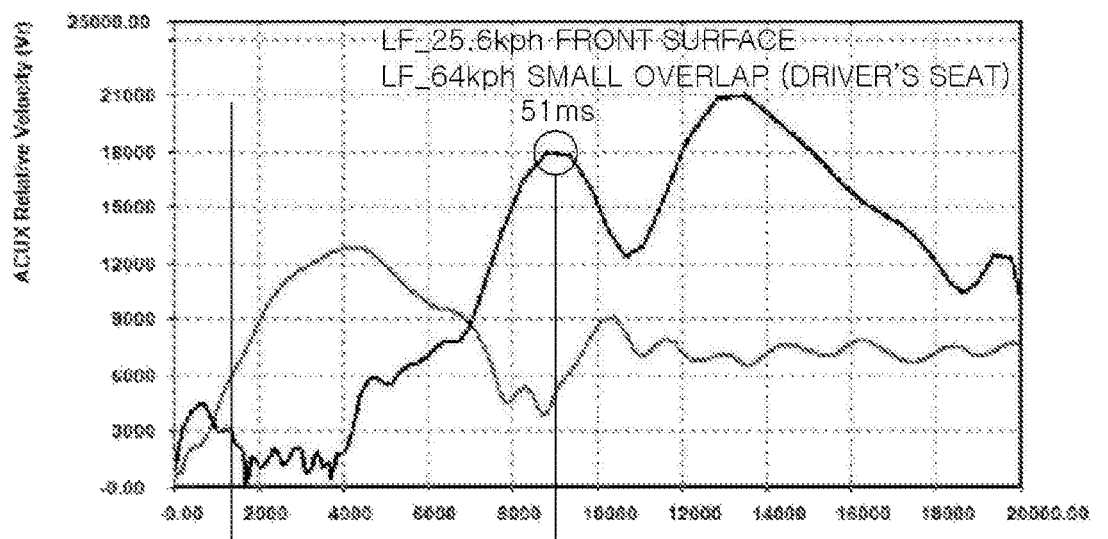
FIG. 9 shows diagrams illustrating airbag signal sensing time points in one form of the present disclosure.
Figure 9:
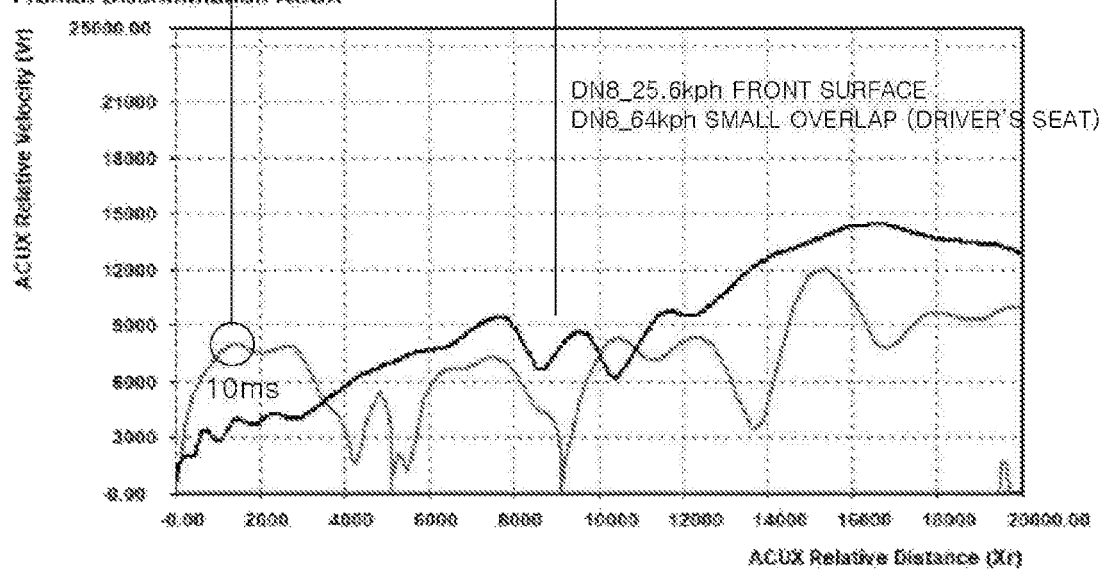

Next, FIGS. 8 and 9 are diagrams comparatively illustrating airbag signal sensing time points between the related art and the present disclosure.

Referring to FIG. 8 illustrating the structure in the related art, the collision signal transfer path is composed of only a single path of the FEM upper member—the front side member, and thus the signal transfer robustness is degraded.

In contrast, referring to FIG. 9 illustrating the structure according to the present disclosure, the collision signal transfer path is dispersed into two paths, and thus the signal transfer robustness is improved.

Accordingly, the kind of collision can be discriminated at an earlier time than that in the related art.

As described above, according to the apparatus for sensing a forward collision according to the present disclosure, because the truss-shaped load path is configured, and the front impact sensor is combined by the integrated hardware, a signal transfer loss is small, and the signal discrimination can be improved.

While the present disclosure has been described with reference to the exemplified drawings, it will be apparent to those of ordinary skill in the art that the present disclosure is not limited to the described embodiments, and various changes and modifications may be made without departing from the spirit and scope of the present disclosure. Accordingly, such changes and modifications should belong to the scope of the present disclosure.

What is claimed is:

1. An apparatus for sensing a forward collision, comprising:
   a front end module (FEM) upper side member extended along a length direction of a vehicle and including: a first end combined with a FEM upper member, and a second end extended toward a fender;
   a front side member extended from a first end portion of the FEM upper member along the length direction of the vehicle;
   a FEM vertical member including: a first end combined with the front side member, and a second end combined with the FEM upper member; and
   a front impact sensor (FIS) configured to sense an impact being applied from a front of the vehicle,
   wherein the FEM upper side member and the FEM vertical member are combined to overlap the FEM upper member.

2. The apparatus of claim 1, wherein the front impact sensor is mounted on a portion where the FEM upper side member and the FEM vertical member are combined to overlap the FEM upper member.

3. The apparatus of claim 2, further comprising: a fender apron upper front member including: a first end combined with the fender, and a second end combined with a FEM,
   wherein the first end of the FEM upper side member is combined with the fender apron upper front member.

4. The apparatus of claim 3, wherein the fender apron upper front member, the FEM upper side member, and the FEM vertical member form a truss structure.

5. The apparatus of claim 4, further comprising: a sensor connection member fastened to the front impact sensor and configured to penetrate the portion where the FEM upper side member and the FEM vertical member are combined to overlap each other.

6. The apparatus of claim 5, wherein the sensor connection member is combined with a FEM fastening member penetrating the FEM upper member.

7. The apparatus of claim 2, wherein a wire connected to the front impact sensor is wired to pass through an interior of the front side member.

8. The apparatus of claim 6,
   wherein the front impact sensor, the FEM fastening member, and the sensor connection member are coaxially deployed.

9. The apparatus of claim 8, wherein a wire connected to the front impact sensor is wired to pass through an interior of the front side member.

* * * * *